(12) United States Patent
Boda et al.

(10) Patent No.: US 12,097,901 B1
(45) Date of Patent: Sep. 24, 2024

(54) AFTER-MARKET SUBFRAME BUSHING SUPPORT FOR A VEHICLE

(71) Applicant: Steeda Autosports, LLC, Pompano Beach, CA (US)

(72) Inventors: Scott B. Boda, Valdosta, GA (US); Mohit M. Patel, Valdosta, GA (US); Brian T. Evans, Pinetta, FL (US); James W. Bell, Tallahassee, FL (US)

(73) Assignee: Steeda Autosports LLC, Pompano Beach, FL (US)

( * ) Notice: Subject to any disclaimer, the term of this patent is extended or adjusted under 35 U.S.C. 154(b) by 0 days.

(21) Appl. No.: 18/536,426

(22) Filed: Dec. 12, 2023

(51) Int. Cl.
  *B62D 21/11* (2006.01)
(52) U.S. Cl.
  CPC .................................. *B62D 21/11* (2013.01)
(58) Field of Classification Search
  CPC .. B62D 21/11; B62D 21/155; B60G 2204/41; B60G 2204/4104; B60G 2204/42
  USPC ...................... 280/124.109, 124.11
  See application file for complete search history.

(56) References Cited

U.S. PATENT DOCUMENTS

| | | | |
|---|---|---|---|
| 10,619,615 B2* | 4/2020 | Dale | B62D 21/11 |
| 11,738,614 B2* | 8/2023 | Musci | B60G 7/001 |
| | | | 280/124.134 |
| 11,767,067 B2* | 9/2023 | Olsson | B60G 11/10 |
| | | | 280/124.109 |
| 2012/0192379 A1* | 8/2012 | Amirian | F16B 9/056 |
| | | | 16/2.5 |
| 2015/0113797 A1* | 4/2015 | Cha | B60G 7/02 |
| | | | 29/724 |

FOREIGN PATENT DOCUMENTS

| | | | | |
|---|---|---|---|---|
| CN | 118024848 A | * | 5/2024 | |
| CN | 118119776 A | * | 5/2024 | B62K 25/08 |
| WO | WO-2022010269 A1 | * | 1/2022 | B60G 7/02 |

OTHER PUBLICATIONS

Suspension Mounting for 2020 Ford Explorer, OEM Parts Online, https://ford.oempartsonline.com/v-2020-ford-explorer—st—3—DIv6-gas/suspension—suspension-mounting. 3 Pages, captured Dec. 12, 2023.

* cited by examiner

*Primary Examiner* — Paul N Dickson
*Assistant Examiner* — Caitlin Anne Miller
(74) *Attorney, Agent, or Firm* — Jon Gibbons; Fleit Intellectual Property Law

(57) ABSTRACT

An after-market subframe bushing support assembly that includes a RS back top bushing member formed as a disc shape with a RS back top bushing member outer diameter and a RS back top bushing member first height, and the RS back top bushing member having a rectangular center opening with rounded corners defined by a pair of RS back top bushing member long sides and a pair of RS back top bushing member short sides, and a RS back top bushing member second height in a second area between the RS back top bushing member short sides and the RS back top bushing member outer diameter. The subframe bushing support assembly reduces noise-vibration-harness compared with other solutions and can easily be installed by car enthusiasts.

15 Claims, 5 Drawing Sheets

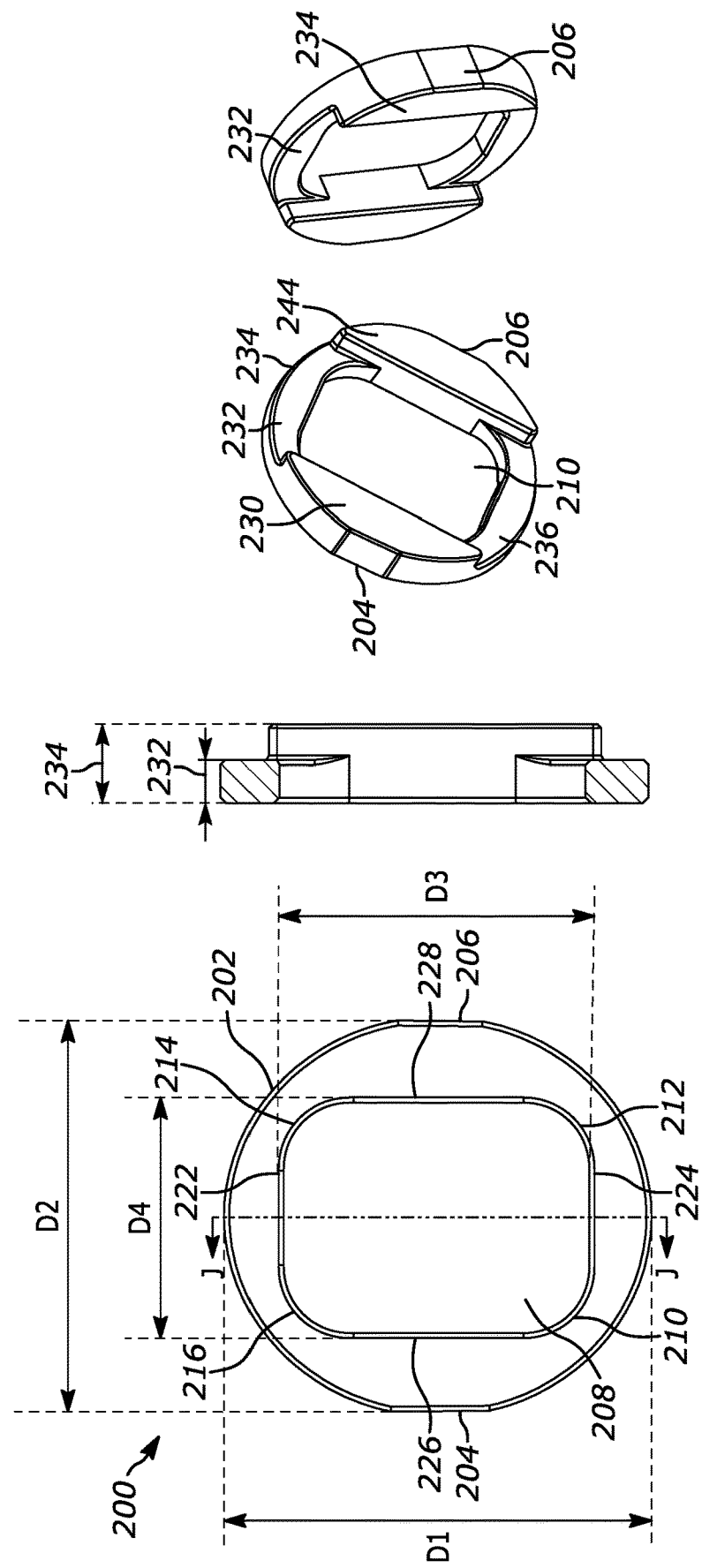

AFTER-MARKET SUBFRAME BUSHING SUPPORT FOR A VEHICLE

FIELD OF THE INVENTION

The present invention generally relates to the field of automotive suspension struts, particularly an upper strut mount assembly.

BACKGROUND OF THE INVENTION

The versatility and performance of newer muscle cars, such as the Ford Explorer and Ford Mustang, permit owners to use one vehicle for multiple purposes. Often, the same vehicle used to carry groceries home from the supermarket is used for racing applications on the weekend. Owners will often modify their vehicles to make it more competitive in their chosen form of racing. One of the most modified areas of a vehicle for racing applications is the suspension.

Suspension tuning can be one of the most critical aspects of getting a vehicle to handle properly for either street or racing applications. Unfortunately, suspensions that are modified exclusively for racing typically will not work properly for street driving, and street suspensions typically do not work well for racing. One of the biggest challenges for a muscle car owner who races his vehicle has been to balance the vehicle for both uses.

Auto enthusiasts often replace rubber rear subframe (RS) bushings with urethane bushings. Urethane bushings are often require several hours to install. This can create unnecessary NVH (Noise-Vibration-Harshness) within the upper strut mount and throughout the vehicle. Excessive vibration can eventually lead to failure of the components. In addition to failure, NVH may have a detrimental effect on ride quality. The vehicle occupants will feel the vibrations, experience a rougher ride, and hear increased noise levels. These increased levels of NVH are not uncommon in race cars, but make for an uncomfortable ride in a street vehicle.

Therefore, a need exists to overcome the problems with the prior art, as discussed above.

SUMMARY OF THE INVENTION

One advantage of the claimed invention is that it is easy to safely install with a minimum number of tools and is therefore possible for even a novice car enthusiast to make modifications to their vehicle by themselves without the need to hire a professional mechanical Another advantage of the claimed invention is that the after-market rear subframe (RS) bushing support reduces NVH compared to other solutions.

Another advantage of the claim invention is that the after-market RS bushing support can be easily removed to return the vehicle to factory condition.

Disclosed is an after-market RS bushing support assembly. The assembly includes a RS back top bushing member formed as a disc shape with a RS back top bushing member outer diameter and a RS back top bushing member first height, and the RS back top bushing member having a rectangular center opening with rounded corners defined by a pair of RS back top bushing member long sides and a pair of RS back top bushing member short sides, and a RS back top bushing member second height in a second area between the RS back top bushing member short sides and the RS back top bushing member outer diameter.

In one example, the RS back top bushing member's first height is about 1.8 times higher than the top bushing second height. For example, the RS back top bushing member's first height is 0.565 inches, and the top bushing's second height is 0.310 inches.

In another example, the RS back top bushing member's long sides has a length of about 2.190 inches and the RS back top bushing member's short sides has a length of about 1.6665 inches and the RS back top bushing member's outer diameter is about 2.850 inches.

In still another example, the RS back top bushing member's long sides has a length of about 2.190 inches and the RS back top bushing member's short sides has a length of about 1.6665 inches, and the RS back top bushing member's outer diameter is about 2.850 inches.

In yet another example, the RS back top bushing member has a flat portion parallel to the RS back top bushing member's long sides that is about 2.800 inches.

The assembly further includes a RS back bottom bushing member formed as a disc shape with a RS back bottom bushing member outer diameter and a RS back bottom bushing member third height, and the RS back bottom bushing member having a substantially rectangular center opening with rounded corners defined by a pair of RS back bottom bushing member long sides and a pair of RS back bottom bushing member short sides, and a RS back bottom bushing member fourth height in at least a portion of a bottom bushing area between the RS back bottom bushing member short sides and the RS back bottom bushing member outer diameter. In one example, the bottom bushing member's short sides are arcuate in shape.

In one example, the RS back top bushing member, the bottom bushing member, or both are formed from aluminum. An example is billet 6061-T6 aircraft aluminum grade.

In one example, the RS back bottom bushing member's short sides are arcuate in shape.

In another example, the RS back bottom bushing member's third height is about 1.2 times higher than the bottom bushing member's fourth height, and the bottom bushing member's third height is about 0.565 inches.

In yet another example, the long sides of the pair of RS back bottom bushing members are flattened U-shapes, with a first portion about 1.1 times wider than a second portion formed near each corner. For example, the first portion is about 2.200 inches, and the second portion is about 2.000 inches.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various examples and embodiments and to explain various principles and advantages all in accordance with the present invention.

FIG. 2A is a top view of an after-market RS back top bushing member and FIG. 2B a cross-sectional view of FIG. 2A taken along line J-J, according to an embodiment of the present invention;

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Overview of Prior Art RS Bushing Support

For vehicles such as cars, sports utility vehicles, or trucks, the RS bushings are rubber or polyurethane cushions designed to isolate vibrations and road noise while enhancing a vehicle's handling. The rear subframe bushings are specially made for specific vehicles and models.

Figure 1:
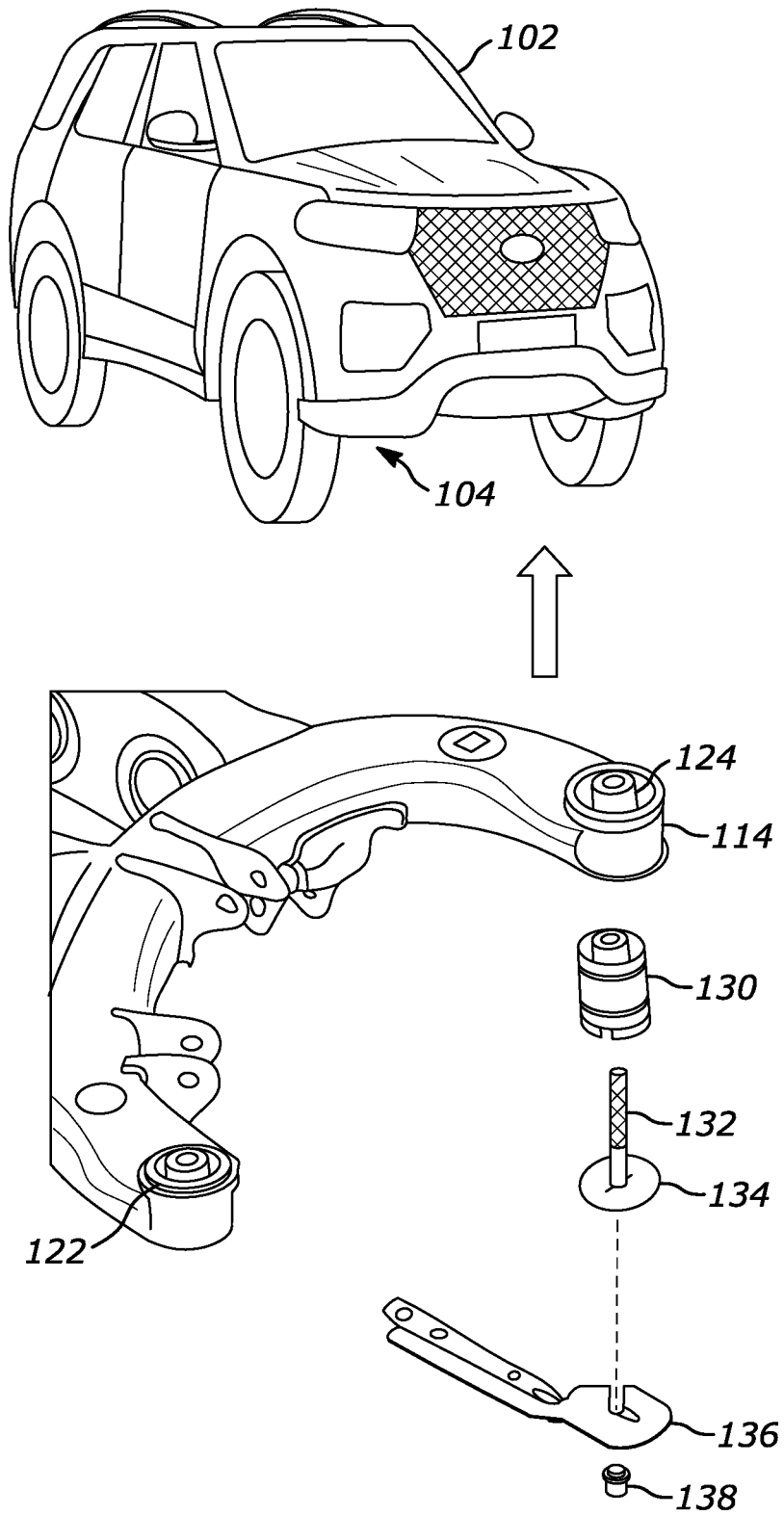
FIG. 1 is a perspective view of a prior art vehicle illustrating an enlarged view of a RS with bushings.

Referring now to FIG. 1, illustrated is a perspective view of a prior art vehicle 102. An enlarged view of RS 114 is shown which attaches to the underside 104 of prior art vehicle 102. They are RS back bushing opening 122 and RS front bushing opening 124. Also shown is an exploded view of the bushing components, starting with RS subframe front opening 124, in which the bushing 130 is held in place with a threaded fastener or bolt 132, washer 134, subframe arm 136, and nut 138, as shown.

After-Market RS Back Top Bushing Member

FIG. 2A is a top view of an after-market RS back top bushing member 200. FIG. 2B is a cross-sectional view of FIG. 2A taken along line J-J. The RS back top bushing member 200 is formed as a disc shape with an outer diameter 202 with diameter, D1. The RS back top member 200 is typically fabricated from metal such as aluminum, but other materials including metals, plastics and composites are possible.

In one example flat regions 204, 206, with diameter D2 are formed along outer diameter 202, with diameter D1 as shown. The RS back top bushing member 200 includes a RS back top bushing member first height 234 in FIG. 2B, and the RS back top bushing member includes a rectangular center opening 208 with rounded corners 210 defined by a pair of RS back top bushing member long sides 226, 228, with diameter D3 and a pair of RS back top bushing member short sides 222, 224.

Also shown is the RS back top bushing member second height 232 in a second area between the RS back top bushing member short sides 222, 224, with diameter D4 and the RS back top bushing member outer diameter 202.

In one example the RS back top bushing member long sides 226, 228, with diameter D3 have a length of about 2.190 inches and the RS back top bushing member short sides 222, 224, with diameter D4 have a length of about 1.6665 inches, and the RS back top bushing member outer diameter is about 3.045 inches.

Further, the portion of the RS back top bushing member has a flat portion parallel to the RS back top bushing member long sides that is about 2.800 inches versus a diameter of 3.045 inches. The RS back top bushing member long sides have a length of about 2.190 inches and the RS back top bushing member short sides 222, 224, with diameter D4 have a length of about 1.6665 inches, and the RS back top bushing member outer diameter is about 2.850 inches.

In one example the RS back top bushing member first height 234 is about 1.8 times higher than the RS back top bushing member second height 232. The RS back top bushing member first height is about 0.565 inches.

After-Market RS Back Bottom Member

Figure 3A:
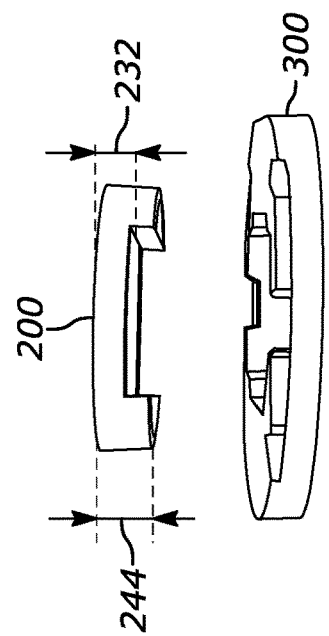
FIG. 3A is a top view of an after-market RS back bottom bushing member and FIG. 3B a cross-sectional view of FIG. 3A taken along line J-J, according to an embodiment of the present invention.
Figure 3B:
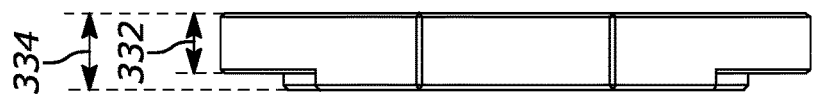

FIG. 3A is a top view of an after-market RS back bottom bushing member 300. FIG. 3B a cross-sectional view of FIG. 3A taken along line J-J. The RS back bottom bushing member 300 is typically fabricated from metal such as aluminum, but other materials including metals, plastics, and composites are possible.

As shown, the RS back bottom bushing member 300 is formed as a disc shape with a RS back bottom bushing member outer diameter 302, D5. The RS back bottom bushing member 300 has a substantially rectangular center opening 308 with rounded corners 310 defined by a pair of RS back bottom bushing member long sides 326, 328 with diameter D9, and a pair of RS back bottom bushing member short sides 322, 324, with diameters D7, D8. In one example, the RS back bottom bushing member short sides 322, 324 are arcuate in shape.

The RS back bottom bushing member 300 has a RS back bottom bushing member third height 334. The RS back bottom bushing member 300 has a fourth height 332 in at least a portion of a bottom bushing area between the RS back bottom bushing member short sides 322, 324, and the RS back bottom bushing member outer diameter 302. In one example, the RS back bottom bushing member third height is about 1.2 times higher than the RS back bottom bushing member fourth height. For example, the third height is about 0.565 inches.

In another example, the pair of RS back bottom bushing member long sides 326, 328, with diameter D7, D8, are a flattened U-shape with a first portion about 1.1 times wider than a second portion formed near each corner. For example a first portion is about 2.200 inches and the second portion is about 2.000 inches.

Figure 4:
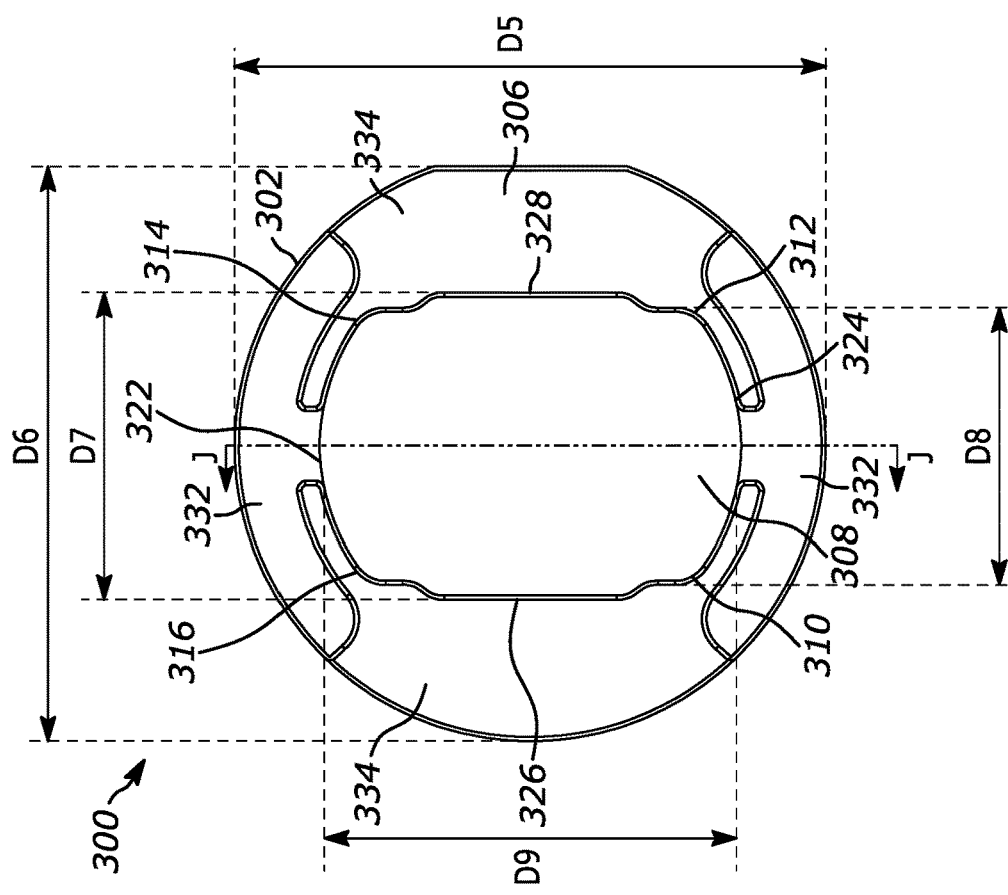
FIG. 4 is a side view of the after-market RS back top bushing member of FIG. 2 and the after-market RS back bottom bushing member of FIG. 3, according to an embodiment of the present invention.
Figure 8:
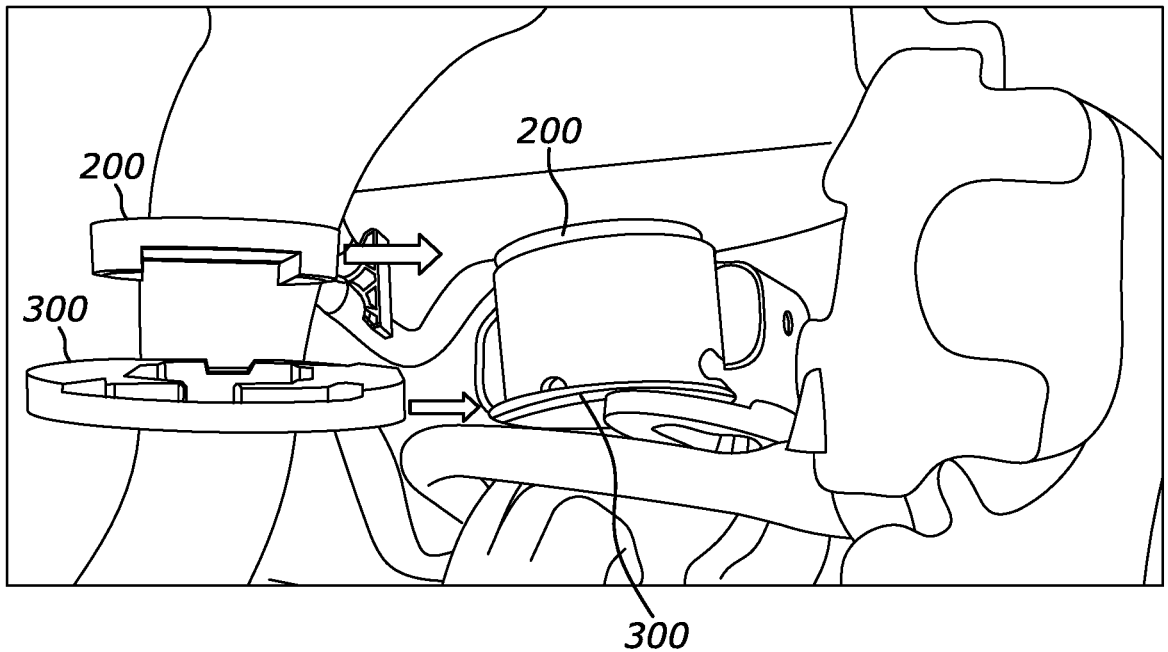
FIG. 8 is a side view of the after-market RS back top bushing member of FIG. 2 and the after-market RS back bottom bushing member of FIG. 3 being installed, according to an embodiment of the present invention.

FIG. 4 is a side view of the RS back top bushing member 200 of FIG. 2 and the RS back bottom bushing member 300 of FIG. 3 positioned with respect to each other during installation, as shown in FIG. 8 below.

After-Market RS Front Top Bushing Member

Figure 5B:
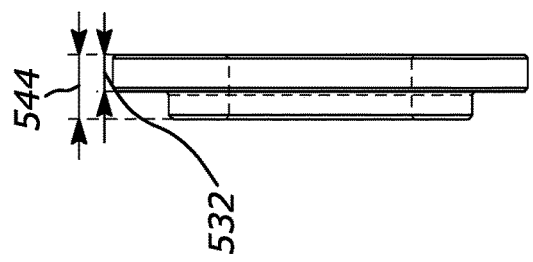
FIG. 5A is a top view of an after-market RS front top bushing member and FIG. 5B a cross-sectional view of FIG. 5A taken along line J-J, according to an embodiment of the present invention.
Figure 5A:
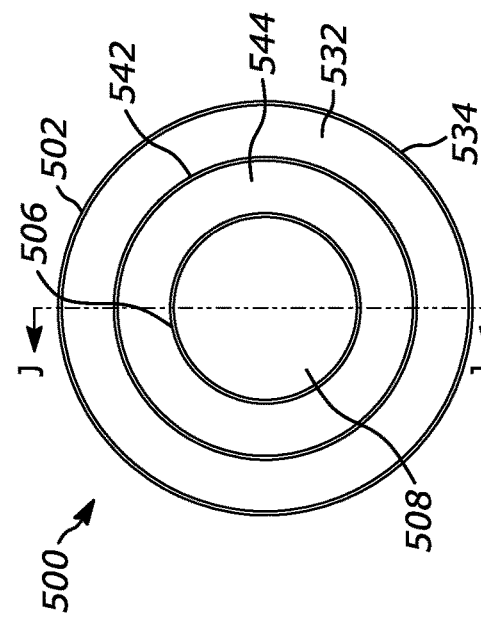

FIG. 5A is a top view of an after-market front top bushing member 500 and FIG. 5B a cross-sectional view of FIG. 5A taken along line J-J. The RS front top bushing member 500 is formed as a set of two stacked disks, as shown, with a large disk 502 with a larger diameter than a smaller disk 542. The RS front top front member 200 is typically fabricated from metal such as aluminum, but other materials including metals, plastics, and composites, are possible.

In one example, the large disk's outer diameter 502 is about 3.700 inches and the smaller disk's 542 outside diameter is about 2.700 inches. The two disks share a common inside circular opening 508. An example diameter of circular opening 508 is about 1.635 inches. As shown in FIG. 5B, the height of the large disk 502 is about 0.325 inches. The combined height of large disk 502 and small disk 542 is about 0.575 inches, as also shown in FIG. 5B. The ratio of the diameter of a larger diameter disk 502 to a smaller diameter disk 542 of the two stacked disks is about 1.37. The ratio of the height of the larger diameter disc 502 to the height of the smaller diameter disc 542 is about 1.3.

After-Market RS Front Bottom Bushing Member

Figure 6B:
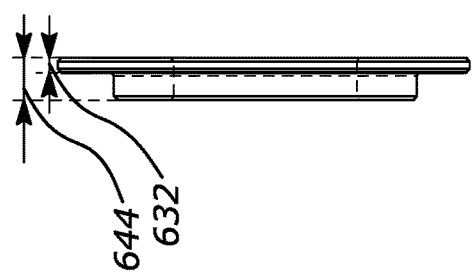
FIG. 6A is a top view of an after-market RS front bottom bushing member and FIG. 6B a cross-sectional view of FIG. 6A taken along line J-J, according to an embodiment of the present invention.
Figure 6A:
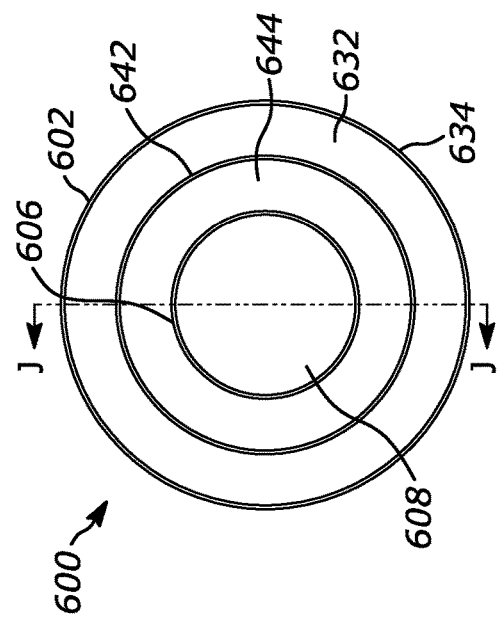

FIG. 6A is a top view of an after-market RS front bottom bushing member 600 and FIG. 6B a cross-sectional view of FIG. 6A taken along line J-J. The RS front bottom bushing member 600 is formed as a set of two stacked disks, as shown, with a large disk 602 having a larger diameter compared to a smaller disk 642. The RS front bottom front member 600 is typically fabricated from metal such as aluminum, but other materials, including metals, plastics, and composites, are possible.

In one example, the large disk's outer diameter 602 is about 3.700 inches and the smaller disk's 542 outside diameter is about 2.700 inches. The two disks share a common inside circular opening 508. An example diameter of circular opening 608 is about 1.635 inches. As shown in FIG. 6B, the height of the large disk 602 is about 0.125 inches. The combined height of large disk 602 and small disk 542 is about 0.375 inches as also shown in FIG. 6B. The ratio of the diameter of the larger diameter disk 602 to the smaller diameter disk 642 of the two stacked disks is about 1.37. The ratio of the height of the larger diameter disc 602 to the height of the smaller diameter disc 642 is about 0.5.

Figure 7:
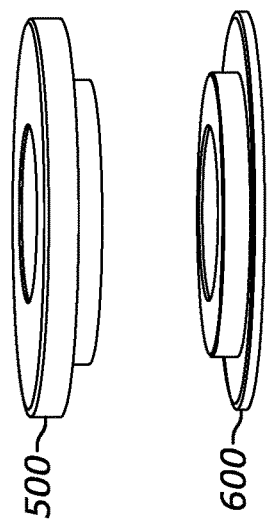
FIG. 7 is a side view of the after-market RS front top bushing member of FIG. 5 and the after-market RS front bottom bushing member of FIG. 6, according to an embodiment of the present invention.
Figure 9:
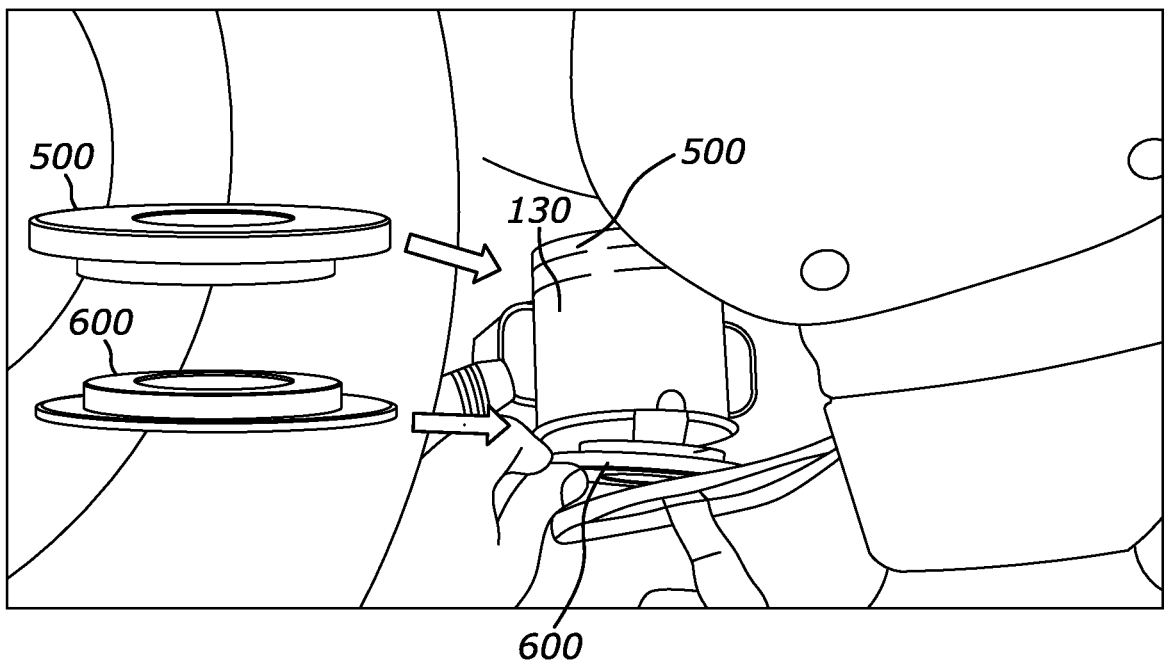
FIG. 9 is a side view of the after-market RS front top bushing member of FIG. 5 and the after-market RS front bottom bushing member of FIG. 6 being installed, according to an embodiment of the present invention.

FIG. 7 is a side view of the RS front top bushing member 500 of FIG. 5 and the RS front bottom bushing member 600 of FIG. 6, according to an embodiment of the present invention, positioned with respect to each other during installation, as shown in FIG. 9 below.

After-Market RS Back Bushing Assembly Installation

FIG. 8 is a side view of the top rear member 200 of FIG. 2 and the bottom rear member 300 of FIG. 3 being installed as part of the RS back bushing member supports.

FIG. 9 is a side view of the top front member 500 of FIG. 5 and the bottom front member 600 of FIG. 6 being installed as part of the RS front bushing member supports.

NON-LIMITING EXAMPLES

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A vehicle after-market rear subframe (RS) bushing support assembly comprising:
   a RS back top bushing member formed as a disc shape with a RS back top bushing member outer diameter and a RS back top bushing member first height, and the RS back top bushing member having a rectangular center opening with rounded corners defined by a pair of RS back top bushing member long sides and a pair of RS back top bushing member short sides, and a RS back top bushing member second height in a second area between the RS back top bushing member short sides and the RS back top bushing member outer diameter; and
   a RS back bottom bushing member formed as a disc shape with a RS back bottom bushing member outer diameter and a RS back bottom bushing member third height, and the RS back bottom bushing member having a substantially rectangular center opening with rounded corners defined by a pair of RS back bottom bushing member long sides and a pair of RS back bottom bushing member short sides, and a RS back bottom bushing member fourth height in at least a portion of a bottom bushing area between the RS back bottom bushing member short sides and the RS back bottom bushing member outer diameter.

2. The vehicle after-market RS bushing support assembly of claim 1, wherein the RS back top bushing member, the RS back bottom bushing member, or both are formed from aluminum.

3. The vehicle after-market RS bushing support assembly of claim 1, wherein the RS back top bushing member first height is about 1.8 times higher than the RS back top bushing member second height.

4. The vehicle after-market RS bushing support assembly of claim 3, wherein the RS back top bushing member first height is about 0.565 inches.

5. The vehicle after-market RS bushing support assembly of claim 1, wherein the RS back top bushing member long sides have a length of about 2.190 inches and the RS back top bushing member short sides have a length of about 1.6665 inches, and the RS back top bushing member outer diameter is about 3.045 inches.

6. The vehicle after-market RS bushing support assembly of claim 5, wherein the portion of the RS back top bushing member has a flat portion parallel to the RS back top bushing member long sides that is about 2.800 inches versus a diameter of 3.045 inches.

7. The vehicle after-market RS bushing support assembly of claim 1, wherein the RS back top bushing member long sides have a length of about 2.190 inches and the RS back top bushing member short sides have a length of about 1.6665 inches, and the RS back top bushing member outer diameter is about 2.850 inches.

8. The vehicle after-market RS bushing support assembly of claim 1, wherein the RS back bottom bushing member short sides are arcuate in shape.

9. The vehicle after-market RS bushing support assembly of claim 1, wherein the RS back bottom bushing member third height is about 1.2 times higher than the RS back bottom bushing member fourth height.

10. The vehicle after-market RS bushing support assembly of claim 1, wherein the RS back bottom bushing member third height is about 0.565 inches.

11. The vehicle after-market RS bushing support assembly of claim 1, wherein the pair of RS back bottom bushing member long sides are a flattened U-shape with a first portion about 1.1 times wider than a second portion formed near each corner.

12. The vehicle after-market RS bushing support assembly of claim 11, wherein with a first portion is about 2.200 inches and the second portion is about 2.000 inches.

13. The vehicle after-market RS bushing support assembly of claim 1, further comprising:
 a RS front top bushing member formed as two stacked disk shape, with a common center opening, with a ratio of a diameter of a larger diameter disk to a smaller diameter disk of the two stacked disks being about 1.37; and
 a RS front bottom bushing member formed as two stacked disk shape, with a common center opening, with a ratio of a diameter of a larger diameter disk to a smaller diameter disk of the two stacked disks is about 1.37.

14. The vehicle after-market RS bushing support assembly of claim 13, wherein the another RS from top bushing member has a ratio of a height of the larger diameter disc to a height of the smaller diameter disc of about 1.3 inches.

15. The vehicle after-market RS bushing support assembly of claim 14, wherein the another RS back top bushing member has a ratio of a height of the larger diameter disc to a height of the smaller diameter disc of about 0.5 inches.

* * * * *